United States Patent [19]

Feldstein

[11] B 3,916,056

[45] Oct. 28, 1975

[54] PHOTOMASK BEARING A PATTERN OF METAL PLATED AREAS

[75] Inventor: Nathan Feldstein, Kendall Park, N.J.

[73] Assignee: RCA Corporation, New York, N.Y.

[22] Filed: Dec. 29, 1972

[21] Appl. No.: 319,339

[44] Published under the Trial Voluntary Protest Program on January 28, 1975 as document no. B 319,339.

[52] U.S. Cl. ................ 428/209; 427/165; 427/261; 427/287; 427/419; 428/210; 428/432; 428/469

[51] Int. Cl.$^{2}$ ........................................... B44F 1/00

[58] Field of Search ...... 161/1, 6, 146, 196, DIG. 7; 117/37 R, 38, 45, 33.3, 71 R, 123 B, 124 A, 124 C, 212; 427/161, 162, 164, 165, 261, 266, 282, 287, 404, 419; 428/209, 210, 432, 469

[56] References Cited

UNITED STATES PATENTS

| | | | |
|---|---|---|---|
| 3,443,915 | 5/1969 | Wood et al. | 117/45 X |
| 3,639,143 | 2/1972 | Lussow et al. | 117/47 X |

*Primary Examiner*—Thomas J. Herbert, Jr.
*Assistant Examiner*—Bruce H. Hess
*Attorney, Agent, or Firm*—Glenn H. Bruestle; William S. Hill

[57] ABSTRACT

A thin layer of nickel or a nickel alloy, having a thickness such that it transmits about 30–40% of the visible and ultraviolet light, is deposited on an insulating substrate. A pattern of opaque metal areas is deposited on the thin layer of metal and the thin metal layer is heat-treated in air for a time and at a temperature sufficient to make the thin layer sufficiently transparent, adherent, and durable for the intended purpose.

3 Claims, 5 Drawing Figures

PHOTOMASK BEARING A PATTERN OF METAL PLATED AREAS

BACKGROUND

There are numerous industrial applications which require forming a pattern of metal plated areas on an insulating substrate. One such application is printed circuits. Another application is metal photomasks. Photomasks may be used in many different manufacturing operations, all of which require the imaging of light-sensitive materials.

Most electronics industry applications require that photomasks be capable of high resolutions, be 100 percent complete with no parts missing, and have good wearing qualities. In the past, most photomasks in the electronics industry have been made from photographic emulsions. But, for some applications in the industry, especially those involving contact printing, it would found that this type of photomask did not have sufficient abrasion resistance, resulting in a decreased yield with number of exposures.

It was also known that masks can be made from evaporated or sputtered chromium and that these have a harder surface than photographic emulsions. But evaporated or sputtered chromium was not found suitable for making large size photomasks.

It was found that improved photomasks could be made by chemically plating nickel alloys on glass substrates. It was found that this type of mask could be made with satisfactory resolution, good uniformity, with good adherence to substrate and good abrasion resistance. In fact, it was found that nickel layers, properly prepared, had a higher abrasion resistance than chromium layers.

However, in making the photomask pattern, it was found that there was still room for a method which would provide better resolution along with good adherence and strain-free coating when the metal layer was relatively thick. In methods which require etching of a metal coating, the photoresist often has pinholes through which etching fluid penetrates and removes metal from areas where it is supposed to remain.

Some methods of making metal photomasks by electroless deposition of nickel have been based on depositing an overall layer of nickel having the final opacity desired, on a glass substrate and, by a conventional photoresist exposing and developing process, followed by etching away unwanted metal, arriving at the final pattern desired. Since the coating of metal must be thick enough to be opaque to ultraviolet light, i.e., at least about 1500 A, some lateral etching occurs in addition to the vertical etching desired. Although the amount of lateral etching can be tolerated in making photomasks for low-resolution manufactured products, better resolution is desirable for high-resolution products. One method that appears to be possible is by using an additive process of metal deposition rather than a subtractive one. However, past attempts to devise an additive process comprising first sensitizing and activating the substrate for autocatalytic electroless deposition of metal, then coating with a conventional photoresist, exposing and developing the photoresist to provide a pattern of openings where metal is to be deposited and then electrolessly depositing metal in these openings, have been unsuccessful. Lack of success is due to the fact that the photoresist and the processing to which it is normally subjected in development, poison the palladium activator film (or any other monolayer activator film) deposited on the substrate, thus preventing metal from being deposited autocatalytically. This is particularly critical when fine line resolution is involved. If a variation of this process is tried in which a pattern of photoresist is first deposited and then the sensitization and activation processes are performed, the metal which is subsequently electrolessly deposited, deposits on the photoresist as well as the exposed substrate. The use of swelling techniques is generally critical and does not provide good edge delineation.

The present invention is an additive-like process which solves the problem of catalyst poisoning previously encountered. Moreover, there is no metallic etching step required for the final delineation of the pattern.

SUMMARY OF THE INVENTION

The present invention is a process of making a metal photomask or other article on an insulating, heat-resistant substrate. The process steps comprise, first, depositing a layer of a metal such as nickel or a nickel alloy on the substrate, the thickness of the layer being such that it can readily be converted to a substantially transparent film with a heat treatment of reasonable time and temperature. This means that the deposited layer has a light-transmission characteristic of about 30–40% in the visible and ultraviolet. A relatively thick layer (having a thickness of at least about 3 times that of the first metal layer) of a second metal is then deposited on certain desired portions of the first metal layer. The assembly is then heat-treated at a temperature and time sufficient to render the first metal layer sufficiently transparent (i.e., per cent transmission greater than about 70% if the article being made is a photomask). At the same time, the second metal layer is rendered more adherent and abrasion-resistant.

THE DRAWING

FIGS. 1–5 are cross section views illustrating successive steps in making a patterned metal article by the method of the invention.

DESCRIPTION OF PREFERRED EMBODIMENT

In one example of making a patterned metal article in accordance with the present method, a glass plate 2 is thoroughly cleaned and degreased. One surface 4 of the plate is then plated with a thin layer 6 of a nickel-phosphorus alloy. Alternatively, this can also be a nickel-boron alloy.

The complete plating process includes sensitization and activation steps prior to deposition of the metal. To sensitize the glass surface 4, it is dipped in a solution containing about 10 g/l of $SnCl_2.2H_2O$ and 15 cc/l of concentrated (37%) HCl. After the sensitization step, the plate is thoroughly rinsed with water.

The sensitized surface is next activated with a solution of palladium chloride. The activating solution consists of 1 gram per liter of palladium chloride and 1 cc per liter of concentrated (37%) hydrochloric acid. The remainder of the solution is water. The plate is again rinsed with water, after treatment with the activating solution for a brief period.

The activated surface is now plated with nickel by an electroless process. A preferred working bath consists essentially of sufficient of a soluble nickel compound to furnish 5.2 g/l of nickel, about 34 g/l of sodium formate and 15 g/l of $NaH_2PO_2.H_2O$. The bath is maintained at a pH of 5 and a temperature of about 70°C.

The sensitized and activated plate is immersed in this solution for about 1 minute to provide a nickel-phosphorus plating which has a thickness such that it has a light-transmission characteristic of about 40% in the visible and ultraviolet. This layer may have a thickness of about 500 A. At 70° C, the plating will contain about 9% by weight phosphorus which is co-deposited with the nickel.

After the above deposition is completed, the plate is removed from the bath and thoroughly rinsed and then dried.

Time in the plating bath may be used to control coating thickness. Thickness may be such as to impart a light (ultraviolet and visible) transmitting characteristic of 30–40%.

Figure 1:
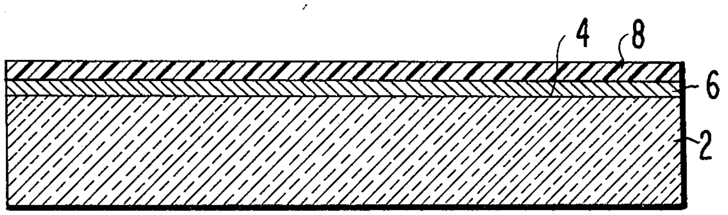
Figure 2:
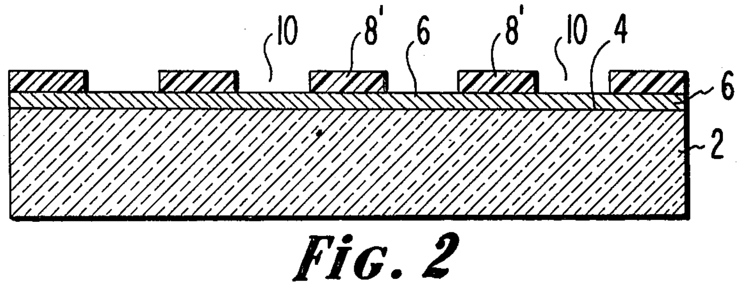

Next, an overall coating of photoresist 8 is deposited on the nickel layer 6. A pattern of openings 10 (FIG. 2) is then formed in the photoresist layer 8 by conventional exposing and developing steps. This pattern of openings corresponds to the desired pattern of metal areas to be formed in the final article. The areas 8' of the photoresist which remain after the developing step, function as a lattice work matrix in the openings of which a pattern of metal is to be deposited.

Figure 3:
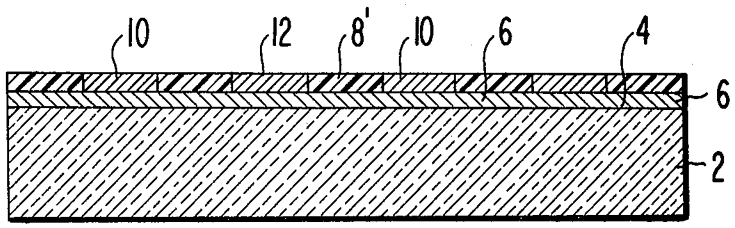

This pattern of metal is formed (FIG. 3) by electrolessly depositing metal areas 12 within the openings 10. The metal areas 12 may be made up of the same nickel-phosphorus alloy as used for the thin metal layer 6. Alternatively, they may comprise other metals such as copper or cobalt. If the same nickel-phosphorus alloy is used, the plating bath may be the same as that described above and the immersion time is about 10 minutes. The thickness of the areas 12 should be at least about 1500 A. At this thickness, the coating is opaque.

Figure 4:
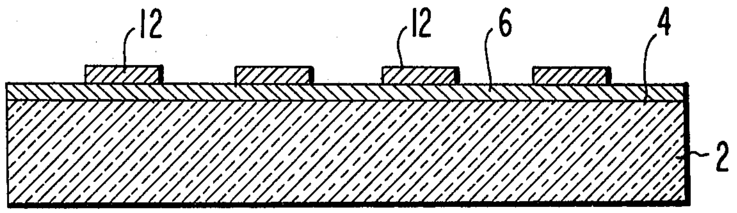

After deposition of the metal areas 12 is complete, the remaining photoresist 8' is dissolved away (FIG. 4), leaving the metal areas 12 protruding as islands.

Figure 5:
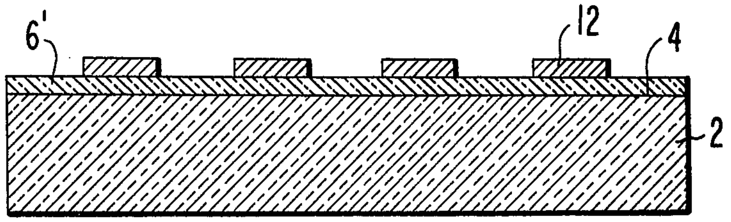

Next, the assembly is heat treated in air at a temperature of at least about 380° C for at least 1 hour. The heating cycle must be long enough to convert the thin metal layer 6 to a layer 6' (FIG. 5) which is sufficiently transparent for the purpose intended. If the article is a photomask, this figure should be at least 70percent transmission in the visible and ultraviolet. The heat treatment is not strong enough to convert the metal areas 12 to transparency. The heat treatment more or less completely oxidizes the thin nickel alloy layer 6 but the exact composition of the oxidized coating has not been determined.

In this example, when the heat treatment was carried out at 380° C for over 1 hour, a spectral examination of the treated film 6' showed that it had a transmission of 80% in the ranges 760 mμ to 320 mμ. In general, it is preferred that light transmission shall increase by about a factor of 2 compared to transmission before heat treating.

One of the advantages of the present method is that the metal pattern areas are entirely formed by building up rather than by etching. This eliminates undercutting of the pattern edges which is one of the main causes of poor resolution. Another advantage is that the thin bottom layer can be selected for best adherence properties and little regard for hardness or etchability. Only the top layer need be selected for abrasion resistance. Also, the method almost entirely eliminates the effect of pinholes usually present in layers of developed photoresist due to presence of unavoidable dirt particles.

The method can also be used to deposit metal patterns on insulating substrates other than glass. When plastics such as Mylar are used, the plating conditions are the same as given in the above examples. However, it must be remembered to keep baking temperatures below that which would damage the plastic.

The first thin layer of metal need not be deposited electrolessly. It may also be deposited by other methods such as sputtering or evaporation. When a "first thin layer of metal" is referred to herein, it is meant to exclude the palladium activator layer which is actually so very thin as to be discontinuous. The palladium is present substantially as a monolayer not having a measurable thickness.

I claim:

1. An article of manufacture comprising a transparent, heat resistant, insulating substrate, a thin substantially transparent layer of oxidized nickel or oxidized nickel alloy directly adhered to said substrate, and a pattern of opaque metal areas on said transparent layer.

2. An article according to claim 1 in which said substrate is glass.

3. An article according to claim 2 in which said opaque metal areas are also composed of a nickel alloy.

* * * * *